Feb. 3, 1948.   E. M. DOUTHAT ET AL   2,435,342
SPACE HEATER AND HEAT OUTPUT INDICATOR THEREFOR
Filed July 5, 1943
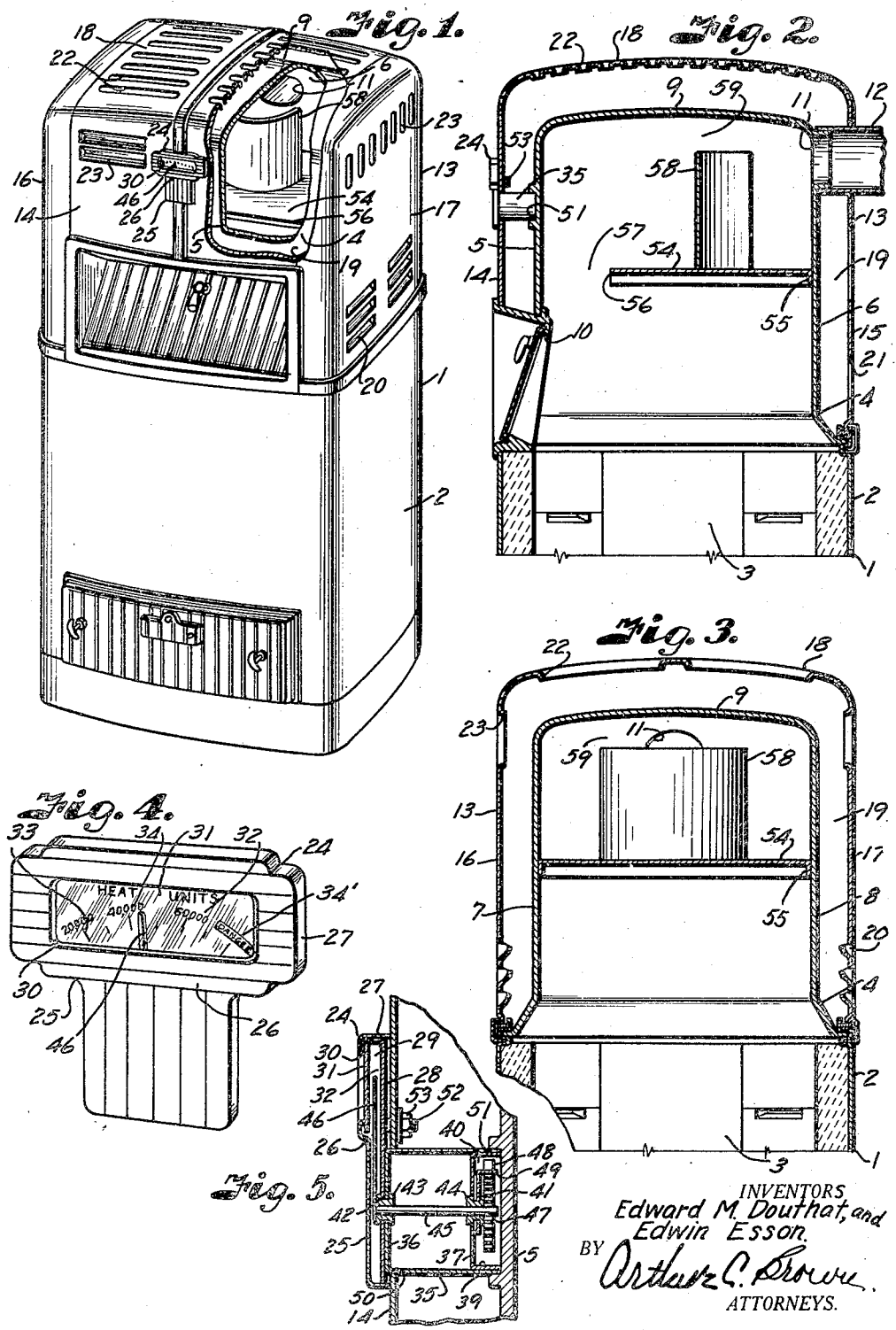
INVENTORS
Edward M. Douthat, and
Edwin Esson.
BY
ATTORNEYS.

Patented Feb. 3, 1948

2,435,342

UNITED STATES PATENT OFFICE 2,435,342

SPACE HEATER AND HEAT OUTPUT INDICATOR THEREFOR

Edward M. Douthat and Edwin Esson, Kansas City, Mo., assignors to Locke Stove Company, Kansas City, Mo., a corporation of Missouri Application July 5, 1943, Serial No. 493,587

2 Claims. (Cl. 73—343)

This invention relates to heaters and particularly to those used in space heating. Heaters of this character are designed by the manufacturer to produce a given amount of heat under efficient fuel burning conditions and usually the size of the heater is designated by the maximum heat unit output of the heater; therefore, the purchaser selects a heater rated corresponding to the heat units required to heat a given space. It is well known that the heat units required for maintaining a given temperature within a given space varies widely, since many buildings are poorly constructed and have many cracks, loose-fitting windows, poor insulation, and other conditions that result in infiltration of cold air and loss of heat. Consequently, the heater purchased for a given space may not maintain the desired temperatures and the purchaser, having no way of determining the operating conditions or heat output of the heater, in many cases assumes that the fault is with the heater and he is dissatisfied with his purchase but the actual fault is that the heater purchased is not large enough to provide the heat necessary for maintaining the desired temperature under the conditions to be met. It also happens that external weather conditions cause fluctuation in room temperature so that at times the desired temperature cannot be obtained with the result that the cause is laid to unsatisfactory and inefficient heater operation whereas the heater may be generating its rated heat output and the fault is poor construction of the building in which the heater is used. This is particularly true of circulating heaters since the effects of infiltration and heat loss are noticed more rapidly.

It is therefore the purpose of the present invention to provide heaters of this character and particularly, circulating, radiant and combination circulating and radiant heaters with an indicator for registering the operating condition or heat output relatively to the maximum output at any time during operation of the heater. It is also a purpose of the present invention to provide a heater construction that is adapted to the successful operation of a heat output indicator. A further object is to provide a heater with means for indicating when the heater is operated over its rated capacity so that the controls governing the burning rates of the fuel may be adjusted to avoid injury to the heater.

In accomplishing these and other objects of the invention, we have provided improved structure, the preferred form of which is illustrated in the accompanying drawing wherein:

Fig. 1 is a perspective view of a combination radiant and circulating heater equipped with heat output indicator in accordance with the present invention, a part of the circulator jacket and combustion chamber dome being broken away to better illustrate the directing and retard members therein.

Fig. 2 is a cross section through the upper portion of the heater, particularly illustrating mounting of the indicator and the directing and retard members for assuring maximum heating of the combustion chamber dome at the point of the actuating element of the indicator.

Fig. 3 is a vertical section taken at right angles to the section illustrated in Fig. 2.

Fig. 4 is a perspective view of the indicator.

Fig. 5 is an enlarged fragmentary section through the indicator and adjacent parts of the circulating jacket and combustion chamber dome on which it is mounted.

Referring more in detail to the drawings:

1 designates a heater which includes a casing section 2 enclosing a combustion chamber 3 and supported thereon is a dome-like top 4 forming an upward continuation of the combustion chamber. The dome has front and rear walls 5—6, side walls 7—8 and a top 9. The front wall 5 has a fuel inlet opening 10 and the rear wall has a vent opening 11 located near the top 7. The vent opening 11 is arranged to be connected by a pipe 12 with a suitable chimney (not shown) whereby sufficient draft is maintained through the combustion chamber to supply the necessary combustion supporting air. The dome section is enclosed by a jacket 13 having front and rear walls 14—15 and side walls 16 and 17 forming upward continuations of the front, rear and side walls of the casing section 2. The jacket also includes a top 18. The jacket is of a size to provide an air circulating passageway 19 around, and across the top of the combustion chamber for circulation of air which is admitted through louvered openings 20 in the side walls and openings 21 in the rear wall. Heated air is discharged through slot-like openings 22 in the top 18 and 23 in the upper portion of the front and side walls 14, 16 and 17.

The casing 2, surrounding the lower portion of the combustion chamber 3, provides a heat radiating surface while the upper portion surrounding the dome 4 provides for heating of the circulated air so that the heater illustrated is a combination radiant and circulating air heater.

As above stated, heaters of this character are rated according to the maximum heat output under efficient operating conditions but the purchaser of such a heater has no way of knowing the heat output when the heater is operated in the space he desires to heat. We have therefore provided means for indicating the operating condition or heat output of the heater as now to be described.

24 designates an indicator assembly which includes a casing 25 having a front 26 which in the illustrated instance is of substantially T-shaped formation and has laterally directed marginal flanges 27 cooperating with rear plate 28 to form a relatively shallow compartment 29. The upper portion of the front 26 has an elongated window opening 30 therein which is preferably covered by a transparent panel 31 so as to expose a scale or chart 32 that is carried on the rear plate 28 and which includes a series of graduations 33 marked in heat units, as indicated by the numerals designated 34. The scale also includes a portion 34' which signifies danger when the pointer moves thereover. Fixed to and extending from the rear plate 28 is a tube-like housing 35 closed at one end by a disk 36 abutting the plate 28 and at the other by an inset head 37, the head 37 having a marginal laterally extending flange 39 fixed to the tube 35 to support the head and provide a compartment 40 for accommodating a heat responsive element 41 therein as later described. Carried in registering openings 42 of the plate 28 and disk 36 of the tube is a bearing 43 that cooperates with a similar bearing 44 carried in the head 37 to rotatably mount a shaft 45. The ends of the shaft projects through the bearings, and the end located within the compartment 29 carries a pointer 46 adapted to move over the scale 32 responsive to actuation of the heat responsive element 41.

The heat responsive element is mounted on the other end of the shaft located within the compartment 37 so that it is immediately adjacent the front wall of the dome. The heat responsive element in the illustrated instance comprises a bi-metal spiral strip having its inner end 47 fixed to the shaft 45 and its outer end 48 anchored to a fixed arm 49 carried by the bearing 44 as shown in Fig. 5.

The indicator assembly just described is mounted on the front wall 14 of the jacket 13 with the tubular portion thereof projecting through an opening 50 so that the end of the tubular portion seats within a recess 51 formed on the front face of the front wall of the combustion chamber dome as shown in Figs. 2 and 5. The indicator assembly is retained in position by fastening devices such as studs 52 projecting from the rear plate 28 through suitable openings in the front wall 14. The projecting ends of the studs are threaded and provided with nuts 53 that are set up against the rear face of the front wall 14 so as to retain the casing within the recess 51 and form a substantially closed chamber for the heat responsive element. Thus the heat responsive element is located adjacent the top of the dome and in front of the heater so it is readily observed. Means is therefore provided to assure travel of the products of combustion into contact with that portion of the front wall of the dome immediately adjacent the heat responsive element. This means includes a horizontally arranged plate member 54 having depending flanges 55 suitably attached to the side rear walls of the dome as shown in Fig. 2. The front edge 56 of the plate member 54 terminates short of the front wall of the dome so as to provide a passageway 57 for the products of combustion moving from the combustion chamber to the vent and cause them to move in sweeping contact with the portion of the dome having the recess 51 and to form a hot spot to activate the heat responsive element. The upper portion of the combustion chamber is also provided with an arcuate retard member 58 seated upon the member 54 and having an upper edge extending partially over the vent outlet and terminating short of the top of the dome to provide sufficient outlet 59 for the products of combustion to the flue.

In equipping a heater of the character described with an indicator as disclosed the maximum heat unit output of the heater is determined when it is operating under efficient fuel burning conditions and the indicator is adjusted so that the pointer indicates on the scale the maximum output of the heater.

When the heater thus equipped is placed in actual operation by a purchaser, the purchaser may at a glance note the output of the heater during any period of operation and if the desired room temperature is not being maintained when the pointer is indicating the maximum heat unit output for which the heater is designed, the purchaser knows that he has obtained a heater too small in capacity for heating the space to the desired temperature. The obvious remedy is to replace the heater with a heater having a higher heating capacity to maintain the temperature desired.

During times when it is difficult to maintain a desired room temperature because of external weather conditions, the operating condition of the heater may be noted by inspecting the location of the pointer relatively to the dial. If the pointer is positioned at the noted rating of the heater, it is recognized that the heater is operating at maximum efficiency and that the inability to maintain the desired temperature is not the fault of the heater; however, if the indicator does not indicate the rated output, it is obvious that the heater is not operating efficiently. Steps can then be taken to correct any condition causing poor or inefficient operation of the heater. Should the pointer reach the danger mark 34' then the operator knows that the heater is being operated over its rated capacity, with the danger of burning out the grates and other parts. He will then close the dampers to reduce the burning rate to the point where the pointer passes out of the danger zone on the indicator scale.

From the foregoing it is obvious that the user may, with the aid of the indicator, purchase a heater of proper size to heat a given space and may obtain efficient and satisfactory operation when heating such space.

What we claim and desire to secure by Letters Patent is:

1. In combination with a space heater having a combustion chamber, a jacket spaced exteriorly of the combustion chamber to provide an air circulatory passageway therebetween, the jacket having an opening in registration with a wall of the combustion chamber, of a temperature responsive indicator comprising a pointer and a scale, a casing having a rear plate for the pointer and the scale, a housing extending from the rear plate, a shaft pivotally mounted in the housing and rear plate to which the pointer is attached, a bimetallic coil mounted in the extended end portion of the housing and attached to the shaft for rotating the same, the indicator being mounted in the opening of the jacket with the extended end of the housing in direct contact with the wall of the combustion chamber whereby the bimetallic coil is substantially sealed off from the space between the jacket and wall of the combustion chamber and will partake of the temperature of the combustion gases in the combustion chamber.

2. In combination with a space heater having a combustion chamber, a packet spaced exteriorly of the combustion chamber to provide an air circulatory passageway therebetween, the wall of the combustion chamber having a recess therein and the jacket having an opening in registration with said recess, of a temperature responsive indicator comprising a pointer and a scale, a casing having a rear plate for the pointer and scale, a cylindrical housing extending from the rear plate, a shaft pivotally mounted in the cylindrical housing and rear plate to which the pointer is attached, a bimetallic coil mounted in the outer end portion of the housing and attached to the shaft for rotating the same, the indicator being mounted in the opening of the jacket with the outer end portion of the cylindrical housing seated in the recess in the wall of the combustion chamber, whereby the bimetallic coil is substantially sealed off from the space between the jacket and wall of the combustion chamber and will partake of the temperature of the combustion gases in the combustion chamber.

EDWARD M. DOUTHAT.
EDWIN ESSON.

REFERENCES CITED

The following references are of record in the file of this patent:

UNITED STATES PATENTS

| Number | Name | Date |
| --- | --- | --- |
| 59,294 | Tingley | Oct. 30, 1866 |
| 1,442,574 | Johnson | Jan. 16, 1923 |
| 1,493,318 | Braun | May 6, 1924 |
| 1,665,992 | Stratton | Apr. 10, 1928 |
| 1,716,473 | Weisenfels | June 11, 1929 |
| 2,093,897 | Riordan | Sept. 21, 1937 |
| 2,280,393 | Ford | Apr. 21, 1942 |

FOREIGN PATENTS

| Number | Country | Date |
| --- | --- | --- |
| 115,813 | France | Dec. 4, 1876 |